(12) United States Patent
Beck (10) Patent No.: US 11,686,375 B2
(45) Date of Patent: Jun. 27, 2023

(54) GEAR UNIT FOR AN ELECTRIC POWERTRAIN

(71) Applicant: ZF FRIEDRICHSHAFEN AG, Friedrichshafen (DE)

(72) Inventor: Stefan Beck, Eriskirch (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/876,129

(22) Filed: Jul. 28, 2022

(65) Prior Publication Data
US 2023/0039003 A1 Feb. 9, 2023

(30) Foreign Application Priority Data
Aug. 6, 2021 (DE) ...................... 10 2021 208 565.2

(51) Int. Cl.
*F16H 3/66* (2006.01)
*B60K 1/00* (2006.01)

(52) U.S. Cl.
CPC .................. *F16H 3/663* (2013.01); *B60K 1/00* (2013.01); *F16H 2200/2007* (2013.01); *F16H 2200/2038* (2013.01); *F16H 2200/2097* (2013.01)

(58) Field of Classification Search
CPC .......... B60K 1/00–02; B60K 2001/001; F16H 2003/442; F16H 2003/445;
(Continued)

(56) References Cited

U.S. PATENT DOCUMENTS 4,224,838 A * 9/1980 Roushdy ............... F16H 47/085
475/903
4,229,996 A * 10/1980 Hildebrand ............... F16H 3/66
475/903
(Continued)

FOREIGN PATENT DOCUMENTS

DE 4114462 A1 * 11/1991
DE 102017008564 A1 * 8/2018
(Continued)

OTHER PUBLICATIONS

Office Action dated Mar. 24, 2022 in corresponding DE Application No. 10 2021 208 565.2.

*Primary Examiner* — David R Morris
*Assistant Examiner* — Lillian T Nguyen
(74) *Attorney, Agent, or Firm* — Cozen O'Connor (57) ABSTRACT

A gear unit for a powertrain of a motor vehicle includes a drive shaft, a driven shaft, first and second planetary gearsets and first and second shifting elements. The first shifting element drivingly connects the drive shaft to an input of the first planetary gearset, and the second shifting element drivingly connects the drive shaft to an input of the second planetary gearset. An output element of the second planetary gearset is connected to the input of the first planetary gearset to be fixed with respect to rotation relative to it, and an output of the first planetary gearset is at least indirectly drivingly connected to the driven shaft. A shared element is fixed with respect to relative rotation and, with an inner toothing, forms a ring gear of the first planetary gearset and, with an outer toothing, forms a sun gear of the second planetary gearset.

15 Claims, 6 Drawing Sheets

(58) Field of Classification Search
CPC ..... F16H 2200/2097; F16H 2200/2035; F16H 3/62–3/666
See application file for complete search history.

(56) References Cited

U.S. PATENT DOCUMENTS

2016/0040768 A1* 2/2016 Beck ................ F16H 37/042
 475/275
2018/0266525 A1* 9/2018 Beck ................ F16H 3/666

FOREIGN PATENT DOCUMENTS

DE  10 2018 131 492     6/2020
DE    102020202344 A1 * 8/2021

* cited by examiner

| | S1 | S2 | S3 |
|---|---|---|---|
| E1 | X | | |
| E2 | | X | |
| E3 | | | X |

GEAR UNIT FOR AN ELECTRIC POWERTRAIN

BACKGROUND OF THE INVENTION

1. Field of the Invention

The invention is directed to a gear unit for a powertrain of a motor vehicle, particularly for a purely electric powertrain with at least one electric machine. The invention is further directed to a powertrain with such a gear unit and to a motor vehicle with such a powertrain.

2. Description of the Related Art

Diverse gear units for motor vehicles are already known from the prior art. In vehicles which are driven purely electrically, the motive power supplied by at least one electric machine is usually transmitted to the output via a gear unit with a single gear step. Such gear units are advantageously configurable to be very compact and cost-effective. In principle, an electric machine which is dimensioned sufficiently large can provide power sufficiently over a wide range of speeds and can therefore cover a sufficiently large range of vehicle speeds with only one gear step. However, the electric machine does not operate consistently at efficient operating points.

Therefore, it is also known to operate electric machines with multi-speed gear units, although this has not been as common in practice. In this case, the electric machine can be dimensioned smaller, but the construction of the gear unit itself is usually more involved compared to a gear unit with only one gear step. In particular, it is disadvantageous that gear units with two gear steps require a large amount of installation space. An automatic transmission with two gear steps is known, for example, from EP 2 449 286 A1.

SUMMARY OF THE INVENTION

Proceeding from this prior art, one object of the invention is to suggest a gear unit with at least two gear steps, and which is compactly constructed and producible economically.

This object may be met according to a first aspect of the invention by a gear unit for a powertrain of a motor vehicle having a drive shaft and a driven shaft and having two planetary gearsets and at least two shifting elements. The first shifting element drivingly connects the drive shaft to an input element of the first planetary gearset, and the second shifting element drivingly connects the drive shaft to an input element of the second planetary gearset. An output element of the second planetary gearset is connected to the input element of the first planetary gearset so as to be fixed with respect to rotation relative to it, and an output element of the first planetary gearset is at least indirectly drivingly connected to the driven shaft. There is provided a shared element which is fixed with respect to relative rotation and which, with an inner toothing, forms a ring gear of the first planetary gearset and, with an outer toothing, forms a sun gear of the second planetary gearset.

By "shaft" is meant within the meaning of the invention a rotatable component part of the gear unit for transmitting torques via which individual components of the gear unit are connected to one another so as to be fixed with respect to relative rotation or via which such a connection is produced when a corresponding shifting element is actuated.

A planetary gearset within the meaning of the invention comprises three different specific elements: at least one sun gear, at least one planet carrier and at least one ring gear. Planet gears which mesh with a toothing of a sun gear and/or with the toothing of a ring gear are rotatably supported on the planet carrier. A planetary gearset can also have a plurality of, e.g., two, planet carriers, one of which carries the inner planet gears while the other carries the outer planet gears. The teeth of the inner planet gears mesh with the teeth of the sun gear on the one hand and with the teeth of the outer planet gears on the other hand. Beyond this, the teeth of the outer planet gears mesh with the teeth of the ring gear. In a configuration of this type, the rotational directions of the sun gear and ring gear are the same as a planetary gearset.

An input element of a planetary gearset is an element—sun gear, planet carrier, ring gear—that is connected to an element on the drive side, while an output element is one that is connected to an element on the output side, motive power being transmitted from the drive via an input element indirectly or directly to an output element and, subsequently, to the output.

By "shifting element" is meant a connecting part by which two torque-transmitting parts can be drivingly connected to one another. The shifting element has at least one open position and one closed position. In the open position, the shifting element cannot transmit torque between two parts cooperating with the shifting element. In the closed position, the shifting element can transmit a torque between two parts cooperating with the shifting element. Insofar as there is a driving connection between two gear unit elements, torques and forces or a rotational movement are transmitted from one gear unit element to the other gear unit element. A shifting element can be, for example, a jaw clutch or a friction clutch.

By "driving connection" is meant a connection between two torque-conducting parts which allows a motive power to be transmitted between the parts. In particular, the two parts are suitably mounted in this regard. Driving connections are understood to mean connections with or without transformation ratio or intermediate component parts.

"Fixed with respect to relative rotation" means that the element in question is prevented from rotating particularly in that it is connected to a stationary element of the gear unit such that it is fixed with respect to rotation relative to it. Preferably, an element which is fixed with respect to relative rotation is connected to a stationary housing of the gear unit.

With the gear unit according to the invention, two gear steps, each having a different transmission ratio, can be engaged for an electric machine acting on the drive shaft. By "gear step" is meant a sum of transmission ratios of a shifted drive path in the gear unit. In the first gear step, only the transmission ratio between the input element and output element of the first planetary gearset is shifted in the drive path, whereas in the second gear step the transmission ratio between the input element and output element of the second planetary gearset is additionally shifted in the drive path. Both of these transmission ratios are preferably gear reductions, i.e., have a transmission ratio of i>1. With two gear steps, the gear unit can advantageously be configured such that the electric machine can be operated over a wide range of speeds in a motor vehicle in an efficient engine speed range.

Further, it is possible by the shared element to allocate multiple functions to a single component part and thus provide a simple gear unit having few component parts and a correspondingly small installation space requirement. In a particularly advantageous manner, the two planetary gearsets are arranged to be nested one inside the other, i.e., one above the other in radial direction and at least overlapping in axial direction. Particularly preferably, the first planetary gearset is arranged to be centered in axial direction in the second planetary gearset so that the radial center planes of the planetary gearsets are aligned with one another. The gear unit is then compact particularly in axial direction.

The shared element has the cross section of a ring which has teeth on its inner side as well as on its outer side. The shared element extends in axial direction over an area spanning both planetary gearsets. In so doing, the toothing extends on the inner side by which the ring gear of the first planetary gearset is configured, axially preferably over the same area—or an area centrally aligned therewith—as the toothing on the outer side by which the sun gear of the second planetary gearset is configured. At least one toothing preferably extends over the entire axial length of the shared element. It is also possible, but less preferable, that the teeth are arranged to be offset in axial direction relative to one another or off-center relative to one another so that the planetary gearsets as a whole are arranged to be offset relative to one another, for example, if this offers advantages for configuring the installation space.

The shared element is fixed with respect to relative rotation, i.e., prevented from rotational movement. To this end, the shared element is particularly preferably fastened to the housing of the gear unit or to a structural component part which is fixed with respect to the housing. The element formed by the shared element is then fixed in the individual planetary gearsets in each instance such that the other element of the two elements, respectively, forms the input element and output element. The two planetary gearsets are then operated in two-shaft mode at any time. As a result of the shared element being fixed, the input element and the output element of each planetary gearset are drivingly connected to one another. Advantageously, only one element need be stationary for this purpose, namely, the shared element.

In a preferred embodiment configuration, the shared element is integrally formed. Only one individual production process is needed for an individual part without requiring a plurality of parts to be joined. In an alternative embodiment configuration, the shared element is formed of a plurality of parts, particularly of two parts. The plurality of parts can then be produced individually and have connection means by which they are connectible or connected to one another, respectively, by frictional engagement, positive engagement or material bonding.

It is further preferable that the input element of the first planetary gearset is a sun gear. In particular, the first planetary gearset has only one sun gear, one planet carrier and one ring gear, respectively, the input element being the sole sun gear. In this case, the output element which is at least indirectly connected to the driven shaft is the planet carrier. In one embodiment configuration, the second planetary gearset is also formed with only one sun gear, one planet carrier and one ring gear, the sun gear being formed by the shared element. Accordingly, in the second planetary gearset, the ring gear is preferably the input element and the planet carrier is preferably the output element.

Alternatively, the planet carrier can also be the input element and the ring gear can be the output element.

According to a preferred embodiment configuration, the second planetary gearset has a lower stationary transmission ratio than the first planetary gearset. The stationary transmission ratio, or fixed carrier train ratio, is the transmission ratio between the sun gear and ring gear when the planet carrier is stationary. In this way, the overall transmission ratios of the two gear steps can be configured such that they ensure an efficient operation of the electric machine over a large speed range of the motor vehicle.

The second planetary gearset preferably has more planet gears than the first planetary gearset. The at least one planet carrier of the second planetary gearset encompasses a substantially greater circumference than the planet carrier of the first planetary gearset because the second planetary gearset is arranged outside of the circumference of the first planetary gearset. A greater quantity of planet gears results in a sufficient support of the planet gears of the second planetary gearset in itself.

In an alternative embodiment configuration, at least one planetary gearset is configured as a positive planetary gearset. By positive planetary gearset is meant a planetary gearset having a sun gear, a ring gear and two planet carriers. The two planet carriers are connected to one another so as to be fixed with respect to rotation relative to one another and have inner and outer planet gears in two radial planes. The two planet carriers can also be thought of as an individual planet carrier with receptacles configured in two radial planes for inner and outer planet gears. In a planetary gearset of this type, the relationship of rotational direction between the sun gear and the ring gear is the inverse of that in a planetary gearset with only one planet carrier, also known as negative planetary gearset. The second planetary gearset is preferably configured in this way, and the two planet carriers are then preferably configured as input elements and the ring gear is configured as an output element.

In a further embodiment configuration, a third shifting element is provided, which drivingly connects the drive shaft to the driven shaft. Accordingly, a further gear step can be configured in a simple manner to provide a direct transmission between the drive shaft and driven shaft so that a three-speed variant of the gear unit is provided. The electric machine can accordingly be operated with an efficient engine speed over an expanded range of vehicle speeds. The gear unit still has very compact dimensions in this three-speed variant as well as a small number of component parts so that it can be produced economically.

The shifting elements can be constructed as frictionally engaging shifting elements as well as positively engaging shifting elements. Frictionally engaging shifting elements have the advantage that they can be shifted under load and don't require synchronization of the participating gear unit elements. As frictionally engaging shifting elements, the shifting elements can be disk-type shifting elements. On the other hand, positively engaging shifting elements have the advantage of cost-effective construction. With positively engaging shifting elements, a synchronization can be carried out before a shifting process of the relevant gear unit elements by the electric machine or by a synchronizing mechanism, for example, a synchronizing ring, is arranged on the shifting element.

The first shifting element and the second shifting element can preferably be constructed as double shifting elements. By "double shifting elements" is meant shifting elements which connect a first rotatable gear unit element, particularly a shaft, to a first further rotatable gear unit element in a first shifting position on the one hand or to a second further rotatable gear unit element in a second shifting position on the other hand. In an optionally formed neutral position, the first rotatable gear unit element is not connected to any of the further rotatable gear unit elements. Accordingly, two shifting options can be realized in one shifting element with only one actuator instead of by two individual shifting elements, which results in an appreciably simplified construction. Further, double shifting elements are more compact than two individual shifting elements. If the two shifting elements are frictionally engaging, shifting can continue to be implemented with the double shifting element free from load interruption.

In a further embodiment configuration, a third planetary gearset is arranged between the drive shaft and the shifting elements or between the output element of the first planetary gearset and the driven shaft to form a fixed transmission ratio. The fixed transmission ratio of the third planetary gearset is engaged in all gear steps in the drive path. In this way, larger gear transmission ratios can be realized without the need for excessive dimensioning of the first and/or second planetary gearset for this purpose. With a total transmission ratio increased in this way, the electric machine can have smaller dimensions and can therefore be produced more economically.

The third planetary gearset preferably has a fixed element as well as an input element and an output element and is therefore likewise operable in two-shaft mode at any time.

The second aspect of the invention relates to a powertrain with a gear unit, described above, and with at least one electric machine. The electric machine is connected to the drive shaft so as to be fixed with respect to rotation relative to it and propels it. In one embodiment configuration, the at least one electric machine is arranged coaxially around the drive shaft or coaxial to the planetary gearsets, respectively. A powertrain with especially compact radial dimensioning can be provided in this way. In an alternative embodiment configuration, the at least one electric machine is arranged paraxial to the drive shaft or to the planetary gearsets, respectively, and acts on the drive shaft, for example, via a spur gear stage. A powertrain which is particularly compact in axial direction can be provided in this way. Further, a pre-transmission can be provided by the spur gear stage. The driven shaft acts at least indirectly on at least one wheel shaft of a motor vehicle.

In a preferred embodiment configuration, the driven shaft acts on two wheel shafts via a differential gear, the wheel shafts being arranged coaxial to or paraxial to the planetary gearsets. In case the wheel shafts are arranged coaxial to the planetary gearsets, one of the wheel shafts extends through the gear unit, in which case shafts of the gear unit are configured as hollow shafts and the wheel shaft in question extends through these hollow shafts. In one embodiment configuration, the wheel shaft also extends through the at least one electric machine. In case of a paraxial arrangement of the wheel shafts, the powertrain can be configured more simply, but the total installation space requirement is greater.

In a preferred embodiment of the powertrain, at least one shifting element, particularly preferably all of the shifting elements, are arranged radially and axially inside of a rotor of the at least one electric machine. The rotor is preferably configured as a hollow cylinder. With a coaxial arrangement of the at least one electric machine in particular, the available installation space can accordingly be utilized in a particularly advantageous manner, and a powertrain, which is especially compact particularly in axial direction, can be achieved.

In an embodiment configuration of the powertrain, a second electric machine acts on the gear unit, for example, on an input element of a planetary gearset. A further electric machine such as this can then serve, for example, to synchronize shifting processes in a positively engaging shifting element or for additional propulsion of the motor vehicle.

The third aspect of the invention relates to a motor vehicle having an above-described powertrain.

BRIEF DESCRIPTION OF THE DRAWINGS

In the following, the invention is described referring to drawings showing the various embodiment configurations of the invention. Like or similar elements are provided with consistent reference numerals. In particular, the drawings show.

DETAILED DESCRIPTION OF THE PRESENTLY PREFERRED EMBODIMENTS

Figure 1:
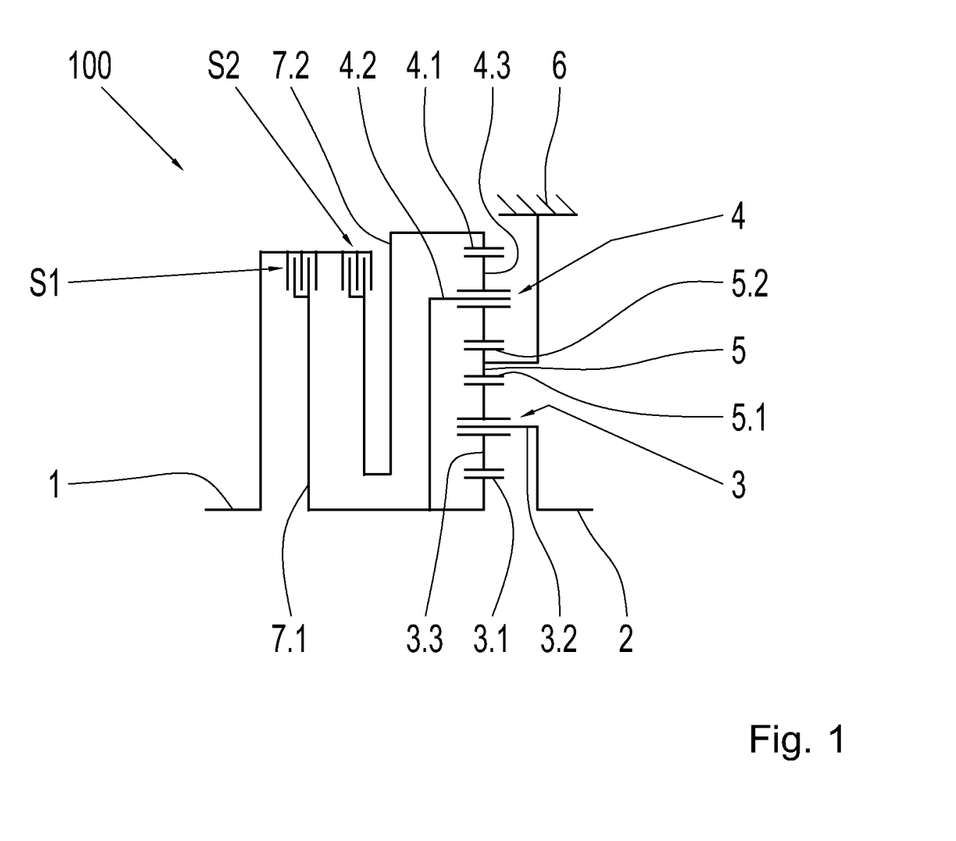
FIG. 1 a first embodiment configuration of a gear unit according to the invention shown schematically.

FIG. 1 shows a first embodiment configuration of a gear unit 100 according to the invention with a drive shaft 1 and a driven shaft 2. Only the upper half of two symmetrical gear unit halves is depicted. The drive shaft 1 is provided to be drivingly connected at its free end to an electric machine. The driven shaft 2 is provided to be connected by its free end at least indirectly to at least one wheel shaft. The gear unit 100 further has a first planetary gearset 3 having a sun gear 3.1 and a planet carrier 3.2 with planet gears 3.3. Further, a second planetary gearset 4 with a ring gear 4.1, a planet carrier 4.2 and planet gears 4.3 is provided. A shared element 5 is provided as ring gear of the first planetary gearset 3 and sun gear of the second planetary gearset 4 and is fixedly connected to a housing 6 so that the shared element 5 is fixed with respect to relative rotation. The shared element 5 has a first toothing 5.1 at its inner side to form the ring gear for the first planetary gearset 3 and a second toothing 5.2 at its outer side to form the sun gear for the second planetary gearset 4.

The drive shaft 1 is connectible to the sun gear 3.1 of the first planetary gearset 3 via a first shifting element S1 and a first connection shaft 7.1 such that the sun gear 3.1 is an input element of the first planetary gearset 3. The drive shaft 1 is connectible to the ring gear 4.1 of the second planetary gearset 4 via a second shifting element S2 and a second connection shaft 7.2 such that the ring gear 4.1 is an input element of the second planetary gearset 4. An output element of the first planetary gearset 3 is the planet carrier 3.2 thereof which is connected to the driven shaft 2 so as to be fixed with respect to rotation relative to it. An output element of the second planetary gearset 4 is the planet carrier 4.2 thereof which is connected to the sun gear 3.1 of the first planetary gearset 3 so as to be fixed with respect to rotation relative to it.

The shifting elements S1, S2 are constructed in this instance as frictionally engaging multiple-disk clutches. An individual actuator can be provided for actuating the respective shifting elements S1, S2 so that the shifting elements S1, S2 form a double shifting element.

Figure 2:
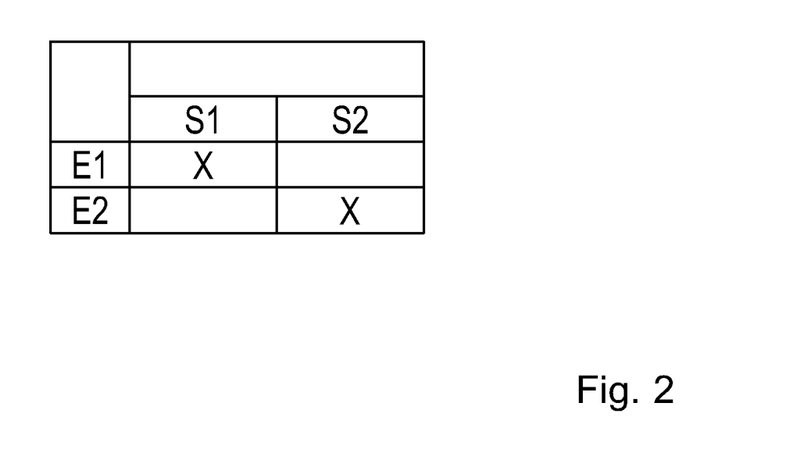
FIG. 2 a schematic depiction of gear steps which can be shifted by the gear unit according to FIG. 1.

FIG. 2 shows a schematic overview of the gear steps E1 and E2 which can be shifted with the gear unit 100 shown in FIG. 1 for driving with an electric machine acting on the drive shaft 1. An "X" indicates that a respective shifting element S1, S2 is closed, and no "X" indicates that it is open.

In a first gear step E1, the first shifting element S1 is closed and the second shifting element S2 is open. A motive power is then transmitted via the drive shaft 1, the first shifting element S2, the first connection shaft 7.1, the sun gear 3.1 of the first planetary gear unit 3, the planet carrier 3.2 of the first planetary gear unit 3 and the driven shaft 2. In this case, only a first transmission ratio of the first planetary gearset 3 is operative in the drive path which is shifted in this way. The first transmission ratio is preferably i>1.

In a second gear step E2, the first shifting element S1 is open and the second shifting element S2 is closed. A motive power is then transmitted via the drive shaft 1, the second shifting element S2, the second connection shaft 7.2, the ring gear 4.1 of the second planetary gearset 4, the planet carrier 4.2 of the second planetary gearset 4, the sun gear 3.1 of the first planetary gear unit 3, the planet carrier 3.2 of the first planetary gear unit 3 and the driven shaft 2. The first transmission ratio of the second planetary gearset 3 and a second transmission ratio of the second planetary gearset 4 are operative in the drive path shifted in this way. The second transmission ratio is preferably the same as the first transmission ratio i>1.

The gear steps E1, E2 described above and all of the gear steps described in the following can be operated in positive and negative rotational directions in order to drive the motor vehicle in forward direction or in reverse direction.

Embodiment configurations of a gear unit according to the invention diverging from the gear unit 100 according to FIG. 1 are described in the following. Like reference numerals denote like features and will not be described again. Chiefly the differences will be discussed.

Figure 3:
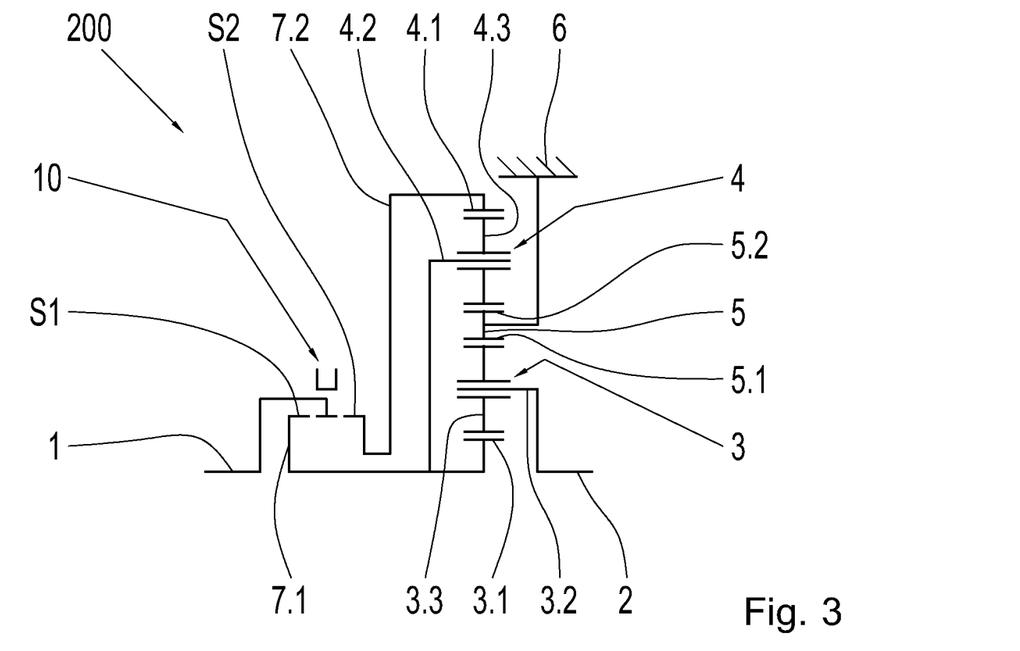
FIG. 3 a second embodiment configuration of a gear unit according to the invention shown schematically.

FIG. 3 shows a second embodiment configuration of a gear unit 200 according to the invention. In contrast to the gear unit 100 according to FIG. 1, the shifting elements S1, S2 in this case are not configured as frictionally engaging shifting elements S1, S2 but rather as positively engaging shifting elements S1, S2, for example, as jaw clutches. The shifting elements S1, S2 are configured as a double shifting element having an individual actuator 10 by which shifting is carried out between a first shifting position, a second shifting position and a neutral shifting position. A synchronization of the shafts which is necessary in positive-engagement shifting elements S1, S2 can be ensured by the electric machine or by synchronizing elements, not shown, at the shifting elements S1, S2. The gear steps E1, E2 which can be engaged with the gear unit 200 according to FIG. 3 are those depicted in FIG. 2.

Figure 4:
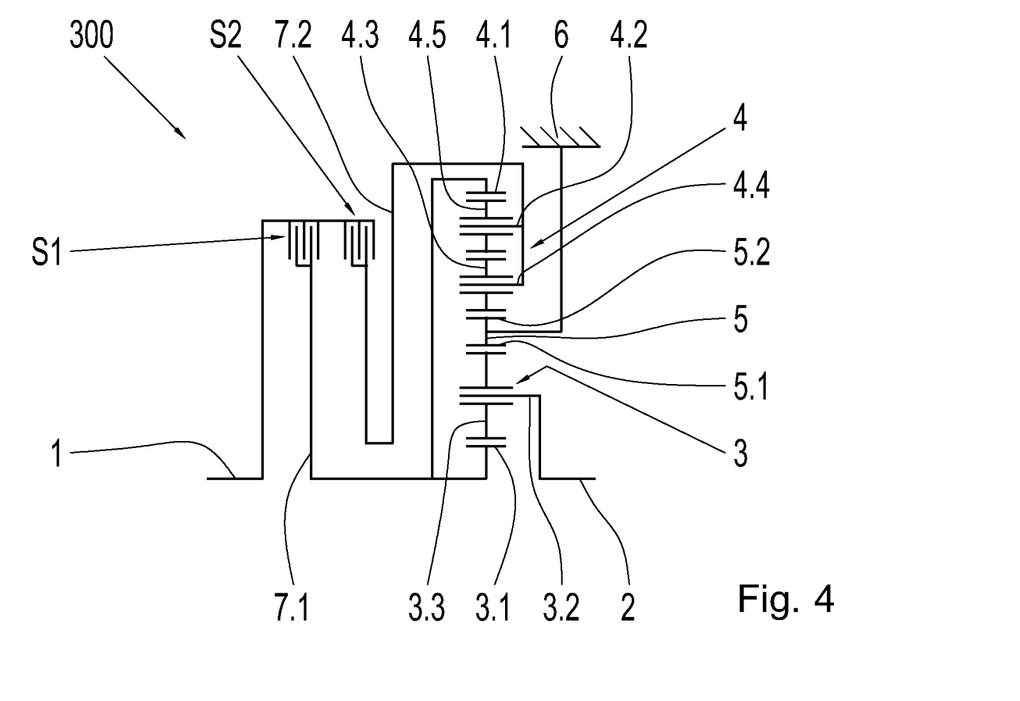
FIG. 4 a third embodiment configuration of a gear unit according to the invention shown schematically.

FIG. 4 shows a third embodiment configuration of a gear unit 300 according to the invention. In contrast to the gear unit 100 according to FIG. 1, the second planetary gearset 4 is configured as a positive planetary gearset, i.e., with a first planet carrier 4.2 and a second planet carrier 4.4. Inner planet gears 4.3 are rotatably arranged on the first planet carrier 4.2 and outer planet gears 4.5 are rotatably arranged on the second planet carrier 4.4. The inner planet gears 4.3 mesh with the shared element 5 and the outer planet gears 4.5, and the outer planet gears 4.5 mesh with the inner planet gears 4.3 and the ring gear 4.1. In this case, the two planet carriers 4.2, 4.4 which are connected to one another so as to be fixed with respect to rotation relative to it form the input element of the second planetary gearset 4 and are correspondingly connectible to the drive shaft 1 by the second shifting element S2, while the ring gear 4.1 forms the output element of the second planetary gearset 4 and is connected to the sun gear 3.1 of the first planetary gearset 3 so as to be fixed with respect to rotation relative to it. The gear steps E1, E2 which are shiftable with the gear unit 300 according to FIG. 4 are the same as those that are shown in FIG. 2; for the second gear step E2, the drive path is changed to the effect that the motive power of the second connection shaft 7.2 is transmitted initially to the planet carriers 4.2, 4.4 of the second planetary gearset 4.4 and then to the ring gear 4.1 of the second planetary gearset 4.4 and subsequently to the input element of the first planetary gearset 3.

Figure 5:
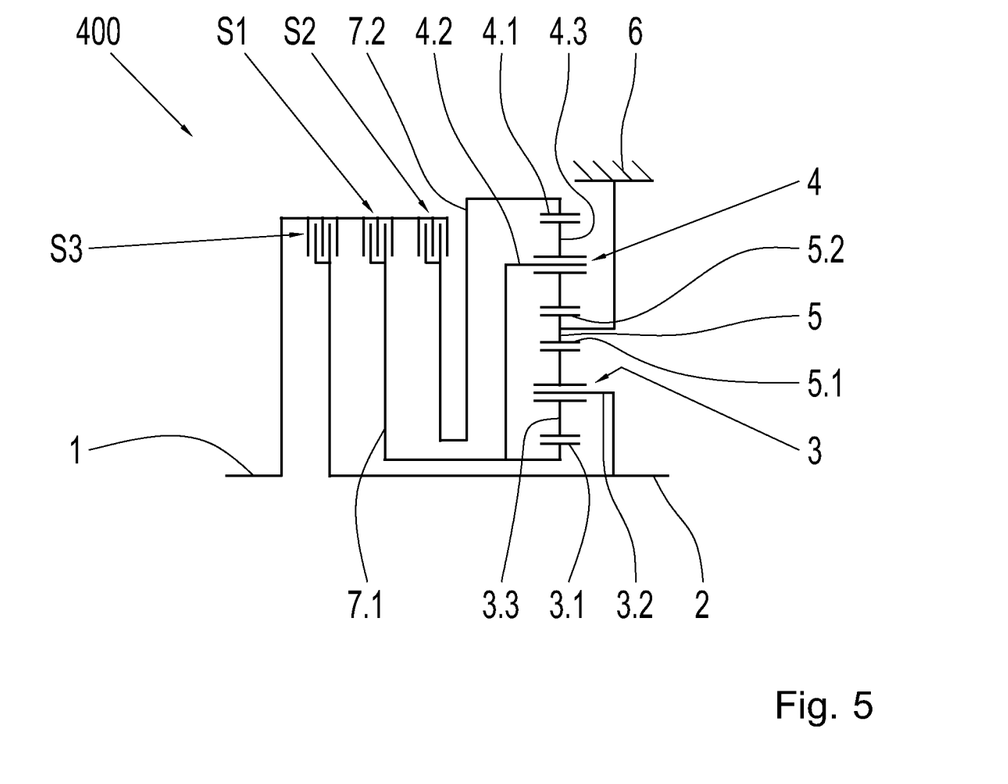
FIG. 5 a fourth embodiment configuration of a gear unit according to the invention shown schematically.

FIG. 5 shows a fourth embodiment configuration of a gear unit 400 according to the invention. In contrast to the gear unit 100 according to FIG. 1, a further shifting element S3 is provided which connects the drive shaft 1 directly to a driven shaft 2 so that none of the planetary gearsets 3, 4 are shifted in a gear step E3 formed by the third shifting element S3 in the drive path. Like the first shifting element S1 and the second shifting element S2, the third shifting element S3 is also constructed as frictionally engaging multiple-disk clutch.

Figure 6:
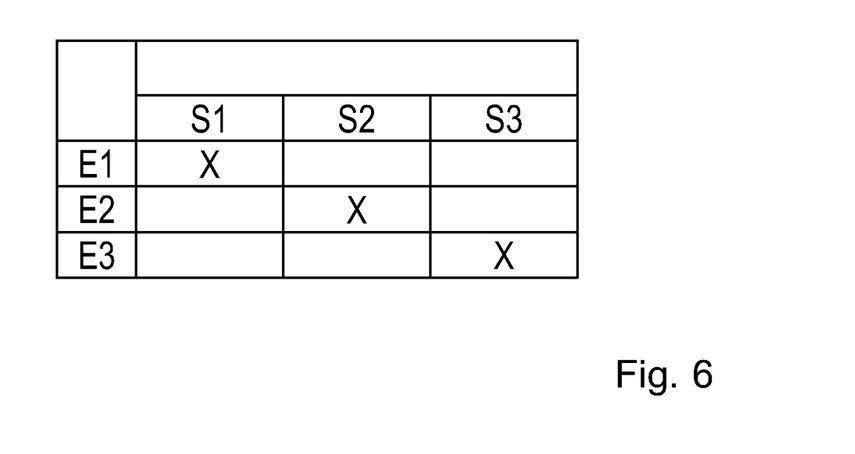
FIG. 6 a schematic depiction of gear steps which can be engaged with the gear unit according to FIG. 5.

Based on the same principle as FIG. 2, FIG. 6 shows a schematic overview of gear steps E1, E2 and E3 which can be shifted with the gear unit 400 shown in FIG. 5 or an electric machine acting on the drive shaft 1. The first two gear steps E1 and E2 correspond to the first and second gear steps E1, E2 according to FIG. 2 and FIG. 1, the third shifting element S3 being open in each instance.

In a third gear step E3, the first shifting element S1 is open, the second shifting element S2 is open and the third shifting element S3 is closed. A motive power is then transmitted via the drive shaft 1, the third shifting element S3 and the driven shaft 2. A direct transmission, where i=1, is operative between the drive shaft 1 and the driven shaft 2.

Figure 7:
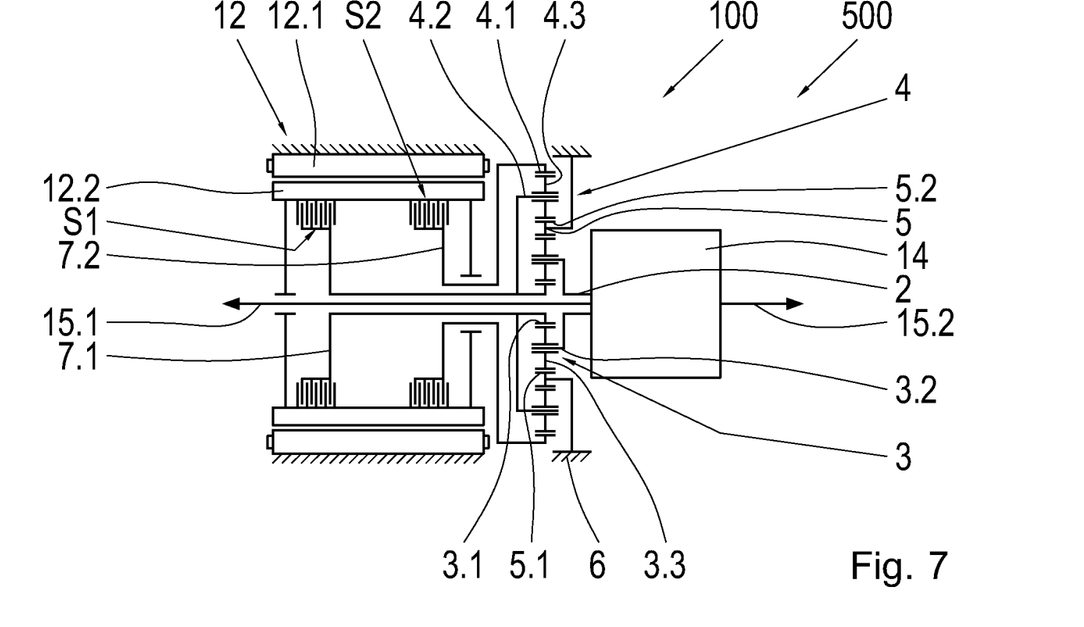
FIG. 7 a first embodiment configuration of a powertrain according to the invention shown schematically.

FIG. 7 shows a first embodiment configuration of a powertrain 500 according to the invention with a gear unit 100 according to the invention as shown in FIG. 1. An electric machine 12 with a stator 12.1 and a rotor 12.2 is arranged coaxially around the axis of planetary gearsets 3, 4. Shifting elements S1, S2 are formed directly at the rotor 12.2 so that no further drive shaft 1 is provided in the powertrain 500. The stator 12.1 is fastened to a structural component part of a motor vehicle that is fixed with respect to relative rotation.

On the output side, the driven shaft 2 acts on a differential 14 which distributes the motive power to two wheel shafts 15.1, 15.2. In the depicted embodiment configuration of the powertrain 500, the wheel shafts 15.1, 15.2 are arranged coaxial to the planetary gearsets 3, 4 and to the electric machine 12. The first wheel shaft 15.1 extends through the gear unit 100 and the electric machine 12 and is configured as a solid shaft. The connection shafts 7.1, 7.2 which connect the shifting elements S1, S2 to the input elements of the planetary gearsets 3, 4 and the driven shaft 2 are configured as hollow shafts and are supported at the first wheel shaft 15.1 so as to be rotatable around the latter.

Embodiment configurations of a powertrain according to the invention which deviates from the powertrain 500 according to FIG. 7 are described in the following. Like reference numerals designate like features and are not explained again. The following remarks relate chiefly to the differences between them.

Figure 8:
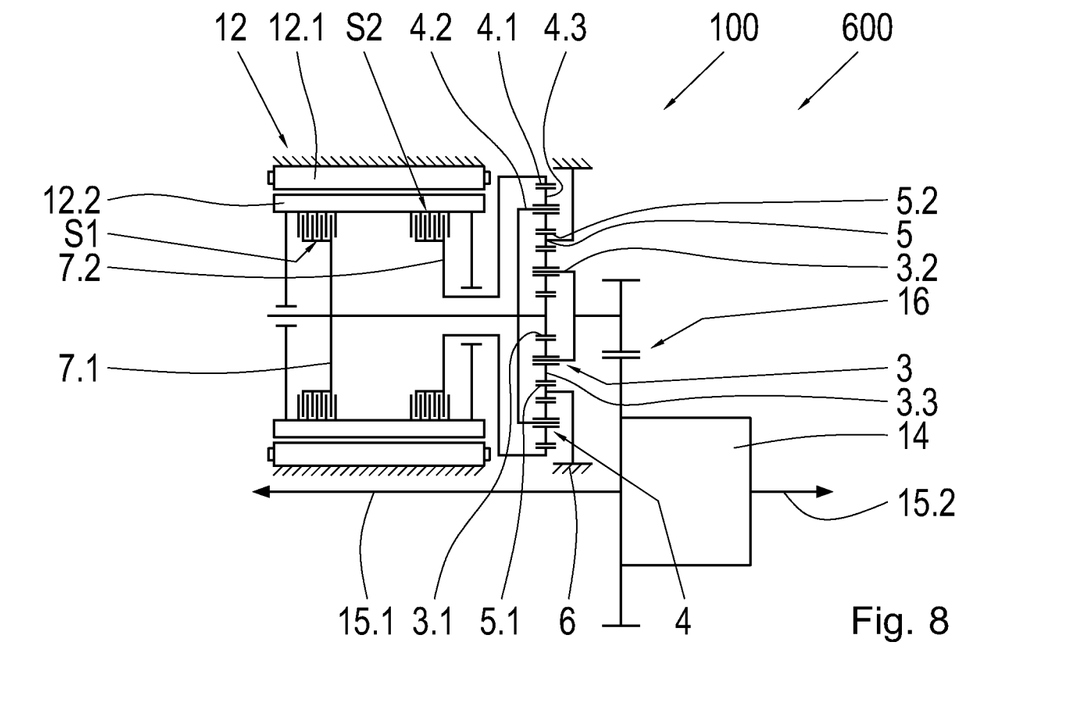
FIG. 8 a second embodiment configuration of a powertrain according to the invention shown schematically.

FIG. 8 shows a second embodiment configuration of a powertrain 600 according to the invention. In contrast to the powertrain 500 according to FIG. 7, the wheel shafts 15.1, 15.2 are offset paraxial to the planetary gearsets 3, 4 and relative to the electric machine 12. Therefore, the wheel shafts 15.1, 15.2 do not extend through the gear unit 100 so that the gear unit 100 can be formed in a simplified manner with the first connection shaft 7.1 as solid shaft and with the second connection shaft 7.2 as a hollow shaft supported at the latter as is also carried out in an embodiment configuration according to FIG. 1. A spur gear stage 16 spanning the axial offset between the two axles and having a transmission ratio which is engaged in all of the gear steps E1, E2 in the drive path is provided between the driven shaft 2 and the differential 14.

Figure 9:
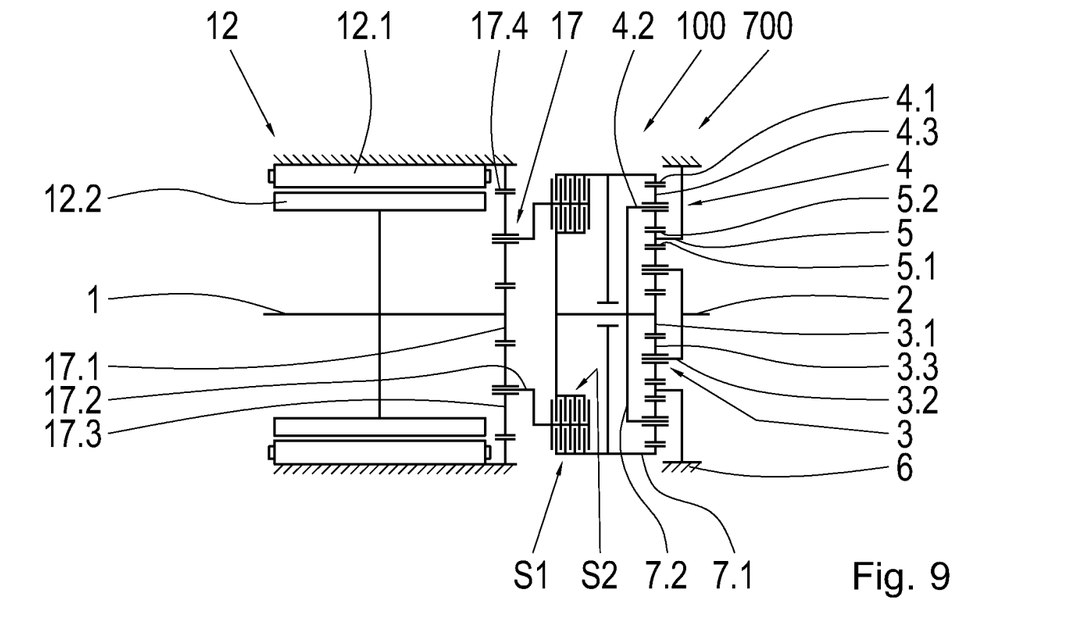
FIG. 9 a third embodiment configuration of a powertrain according to the invention shown schematically.

FIG. 9 shows a second embodiment configuration of a powertrain 700 according to the invention. In contrast to the powertrain 500 according to FIG. 7, the electric machine 12 acts on a drive shaft 1 which is connected to a third planetary gearset 17. The third planetary gearset 17 has a sun gear 17.1, a planet carrier 17.2 with planet gears 17.3, and a fixed ring gear 17.4. The drive shaft 1 drives the sun gear 17.1 of the third planetary gearset 17 which is therefore the input element of the third planetary gearset 17. An output element of the third planetary gearset 17 is the planet carrier 17.2 of the latter which is connected to the shifting elements S1, S2. As a result of the ring gear 17.4, the third planetary gearset 17 is operated at any time in two-shaft mode and accordingly has a fixed transmission ratio. A fixed pre-transmission is connected upstream of the shifting elements S1, S2; the transmission ratio of the third planetary gearset 17 is preferably i>1. The total transmission ratio of the gear unit 100 is increased by the pre-transmission, the third planetary gearset 17 being engaged in the drive path in every gear step E1, E2. The differential 14 and the wheel shafts 15.1, 15.2 are not shown in FIG. 9.

Figure 10:
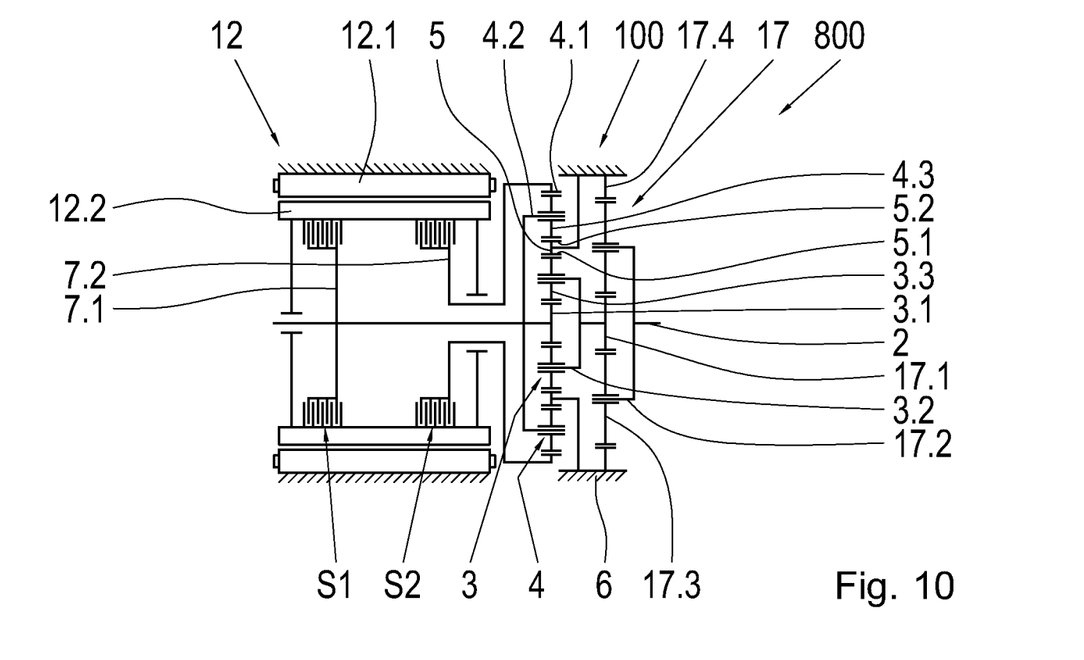
FIG. 10 a fourth embodiment configuration of a powertrain according to the invention shown schematically.

FIG. 10 shows a powertrain 800 which is constructed similar to the powertrain 700 according to FIG. 9 and which has a third planetary gearset 17 downstream of the original gear unit 100. The third planetary gearset 17 is accordingly arranged between the output element of the first planetary gearset 3 and the driven shaft 2. In the third planetary gearset 17, the sun gear 17.1 is again the driver, the planet carrier 17.2 is the output element, and the ring gear 17.4 is fixed so that the third planetary gearset 17 is operated in two-shaft mode and has a fixed transmission ratio. The portion of the powertrain 800 on the drive side of the third planetary gearset 17 corresponds to the corresponding portion of the powertrain 600 according to FIG. 8 and therefore will not be described again. Like the upstream third planetary gearset 17 described referring to FIG. 9, a downstream third planetary gearset 17 is also engaged in the drive path in all gear steps E1, E2 and can accordingly increase the total transmission ratio. Differential 14 and wheel shafts 15.1, 15.2 are not depicted in FIG. 10.

Figure 11:
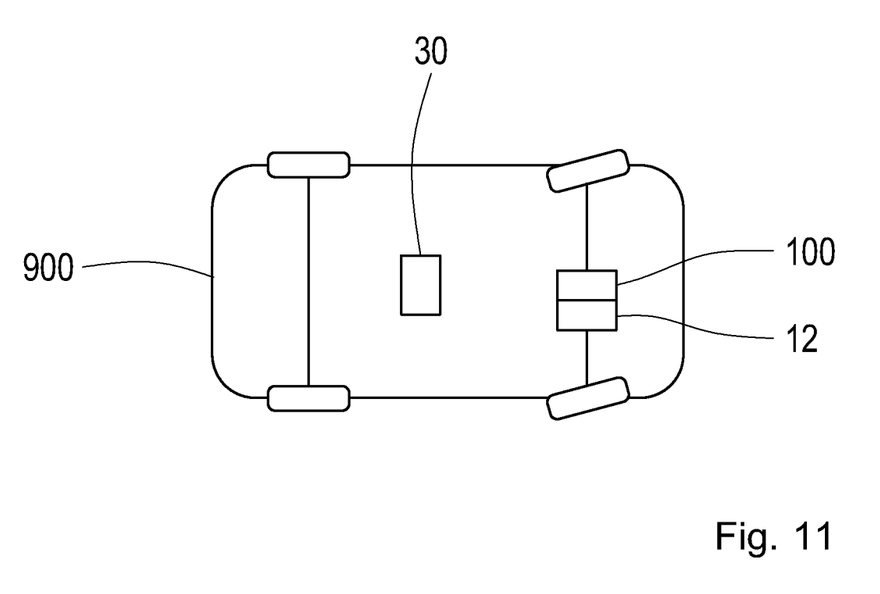
FIG. 11 a motor vehicle according to the invention.

FIG. 11 shows a motor vehicle 900 with a powertrain 500, 600, 700, 800 according to the invention. The powertrain 500, 600, 700, 800 comprises a gear unit 100 and a first electric machine 12 which acts on the gear unit 100. Further, the motor vehicle 900 comprises an energy accumulator 30 by which the first electric machine 12 can be supplied with energy. The energy accumulator 30 is preferably a rechargeable battery.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

REFERENCE CHARACTERS 1 drive shaft
2 driven shaft
3 first planetary gearset
3.1 sun gear of the first planetary gearset
3.2 planet carrier of the first planetary gearset
3.3 planet gears of the first planetary gearset
4 second planetary gearset
4.1 ring gear of the second planetary gearset
4.2 first planet carrier of the second planetary gearset
4.3 inner planet gears of the second planetary gearset
4.4 second planet carrier of the second planetary gearset
4.5 outer planet gears of the second planetary gearset
5 shared element
5.1 first toothing of the shared element
5.2 second toothing of the shared element
6 housing
7.1 first connection shaft
7.2 second connection shaft
10 actuator
12 electric machine
12.1 stator of the electric machine
12.2 rotor of the electric machine
14 differential
15.1 first wheel shaft
15.2 second wheel shaft
16 spur gear stage
17 third planetary gearset
17.1 sun gear of the third planetary gearset
17.2 planet carrier of the third planetary gearset
17.3 planet carrier of the third planetary gearset
17.4 ring gear of the third planetary gearset
30 energy accumulator
100 gear unit
200 gear unit
300 gear unit
400 gear unit
500 powertrain
600 powertrain
700 powertrain
800 powertrain
900 motor vehicle
E1 first gear step
E2 second gear step E3 third gear step
S1 first shifting element
S2 second shifting element
S3 third shifting element

The invention claimed is:

1. A gear unit (100, 200, 300, 400) for a powertrain (500, 600, 700, 800) of a motor vehicle (900), having a drive shaft (1) and a driven shaft (2) and having a first planetary gearset (3) and a second planetary gearset (4) and at least a first shifting element (S1) and a second shifting element (S2), wherein the first shifting element (S1) drivingly connects the drive shaft (1) to an input element of the first planetary gearset (3), and the second shifting element (S2) drivingly connects the drive shaft (1) to an input element of the second planetary gearset (4), and wherein an output element of the second planetary gearset (4) is connected to the input element of the first planetary gearset (3) so as to be fixed with respect to rotation relative to it, and wherein an output element of the first planetary gearset (3) is at least indirectly drivingly connected to the driven shaft (2), and further comprising a shared element (5) fixed with respect to relative rotation and which, with an inner toothing (5.1), forms a ring gear of the first planetary gearset (3) and, with an outer toothing (5.2), forms a sun gear of the second planetary gearset (4).

2. The gear unit (100, 200, 300, 400) according to claim 1, wherein the shared element (5) is integrally formed.

3. The gear unit (100, 200, 300, 400) according to claim 1, wherein the first planetary gearset (3) and the second planetary gearset (4) are arranged one above the other in radial direction and at least overlapping in axial direction.

4. The gear unit (100, 200, 300, 400) according to claim 1, wherein the input element of the first planetary gearset (3) is a sun gear (3.1), and the input element of the second planetary gearset (4) is a ring gear (4.1) or a planet carrier (4.2).

5. The gear unit (100, 200, 300, 400) according to claim 1, wherein the second planetary gearset (4) has a lower stationary transmission ratio than the first planetary gearset (3).

6. The gear unit (100, 200, 300, 400) according to claim 1, wherein at least one of the first and second planetary gearsets (3, 4) is configured as a positive planetary gearset (3).

7. The gear unit (100, 200, 300, 400) according to claim 1, further comprising a third shifting element (S3) configured to drivingly connect the drive shaft (1) to the driven shaft (2).

8. The gear unit (100, 200, 300, 400) according to claim 1, wherein at least one of the shifting elements (S1, S2, S3) is constructed as frictionally engaging shifting element (S1, S2, S3).

9. The gear unit (100, 200, 300, 400) according to claim 1, wherein at least one of the shifting elements (S1, S2, S3) is constructed as positively engaging shifting element (S1, S2, S3).

10. The gear unit (100, 200, 300, 400) according to claim 1, wherein a third planetary gearset (17) is arranged between the drive shaft (1) and the shifting elements (S1, S2, S3) or between the output element of the first planetary gearset (3) and the driven shaft (2) to form a fixed transmission ratio.

11. A powertrain (500, 600, 700, 800) comprising:
the gear unit (100, 200, 300, 400) according to claim 1; and
at least one electric machine (12).

12. The powertrain (500, 600, 700, 800) according to claim 11, wherein the at least one electric machine (12) is arranged coaxial to the first planetary gearset (3) and second planetary gearset (4).

13. The powertrain (500, 600, 700, 800) according to claim 12, wherein the driven shaft (2) acts on a first wheel shaft (15.1) and second wheel shaft (15.2) via a differential gear (14), and wherein the two wheel shafts (15.1, 15.2) are arranged coaxial to or paraxial to the two planetary gearsets (3, 4).

14. The powertrain (500, 600, 700, 800) according to claim 13, wherein at least one of the shifting elements (S1, S2, S3) is arranged radially and axially inside of a rotor (12.2) of the at least one electric machine (12).

15. A motor vehicle (900) having the powertrain (500, 600, 700, 800) according to claim 11.

* * * * *